(No Model.) 2 Sheets—Sheet 1.
J. SANDT & H. STURM.
APPARATUS FOR STIRRING AND TURNING OVER MALT OR GRAIN.
No. 465,209. Patented Dec. 15, 1891.
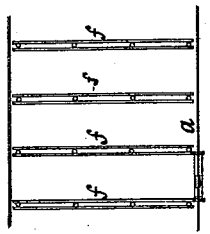
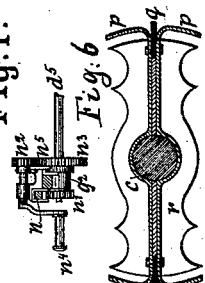
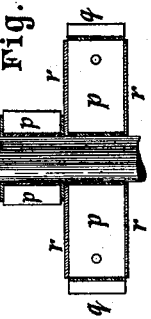
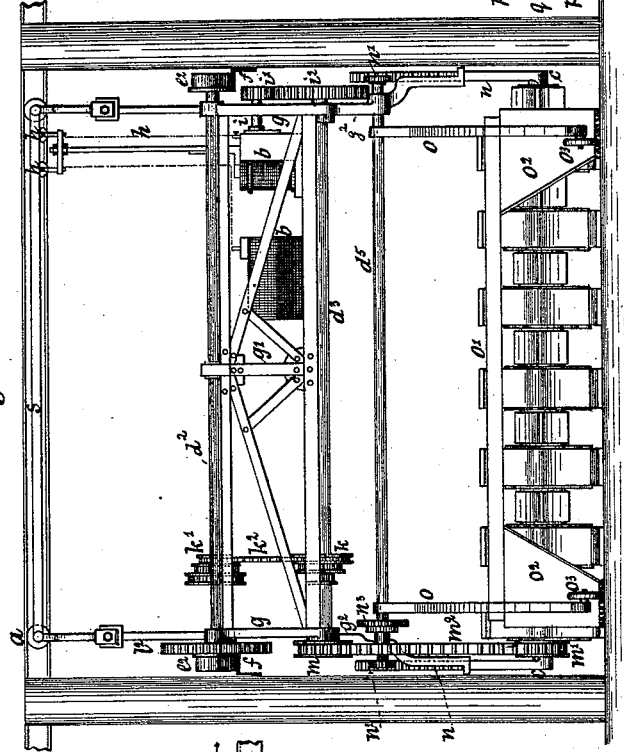
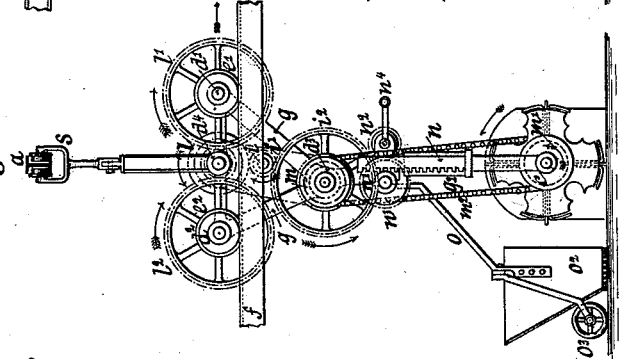

(No Model.) 2 Sheets—Sheet 2.
J. SANDT & H. STURM.
APPARATUS FOR STIRRING AND TURNING OVER MALT OR GRAIN.
No. 465,209. Patented Dec. 15, 1891.
Fig. 8. Fig. 9.
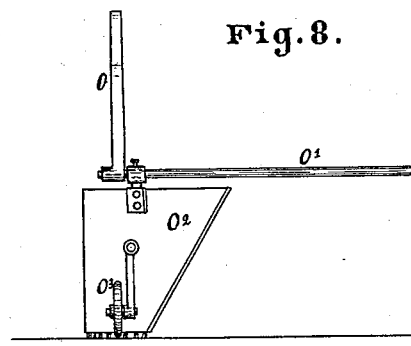
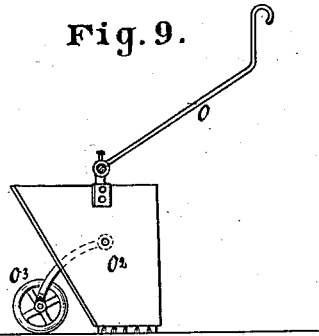
Fig. 10.
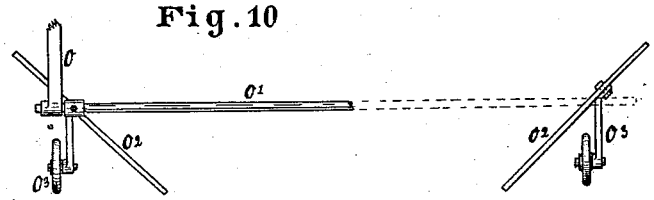
Fig. 11.
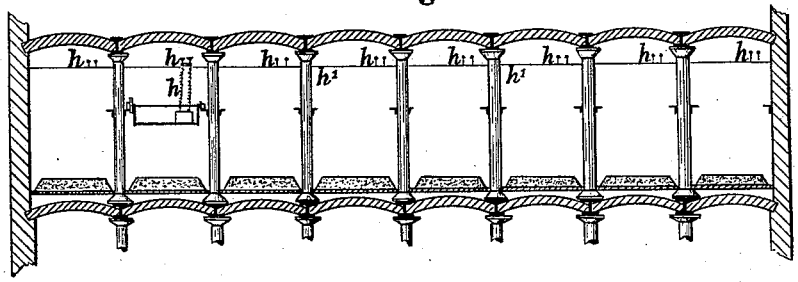
Fig. 12.
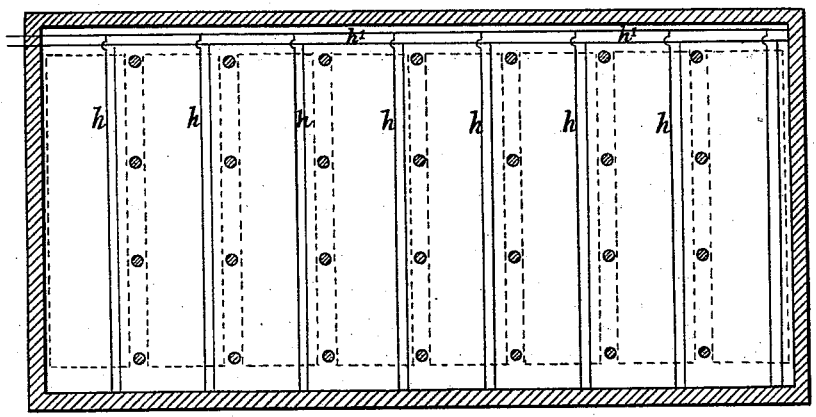
Witnesses: Inventors:

UNITED STATES PATENT OFFICE.

JULIUS SANDT AND HEINRICH STURM, OF LÖBAU, GERMANY.

APPARATUS FOR STIRRING AND TURNING OVER MALT OR GRAIN.

SPECIFICATION forming part of Letters Patent No. 465,209, dated December 15, 1891.

Application filed May 6, 1891. Serial No. 391,718. (No model.)

*To all whom it may concern:*

Be it known that we, JULIUS SANDT and HEINRICH STURM, subjects of the German Emperor, both residing at Löbau, Saxony, Germany, have invented certain new and useful Improvements in Apparatus for Stirring and Turning Over Malt or Grain, of which the following is a specification.

The process of stirring and turning over germinating grain on the floors of malt-houses is generally effected by hand, although many attempts have been made to carry it out by machinery; but no practicable method of doing this has yet been accomplished. A chain, rope, or endless-screw apparatus has generally been used; but this has limited the use of the apparatus to a single division of the malt-floors, and has required a separate apparatus for each division of the floors. By the present invention it is possible with a single apparatus to treat the grain upon all the divisions of the floors, the apparatus being driven by an electrical motor carried upon it and movable over all parts of the floors.

In the accompanying drawings, which are an illustration of the invention, Figure 1 is a ground plan of a malt-floor; Fig. 2, a rear view of the turning-over and stirring apparatus; Fig. 3, a side view of the same; Fig. 4, a horizontal section of the gear for raising and lowering the turning-over apparatus; Fig. 5, a plan of the gathering-in apparatus at the ends; and Figs. 6 and 7 are views, on a larger scale, of the revolving mixing or turning-over devices; Fig. 8, a face view of the mold-board detached; Fig. 9, an end view thereof; Fig. 10, a top view thereof; Fig. 11, a vertical longitudinal section of the floor, showing the electric conducting-wires $h$ $h'$; and Fig. 12, a sectional plan thereof.

Before the mixing apparatus itself is described the method in which it is operated and made to pass over the whole of the malt-floors will first be explained.

Fig. 1 of the accompanying drawings shows a general plan of the several adjoining divisions of a floor, which are separated from one another by the rows of columns which support the roof. The turning over of the germinating grain is effected in each division of the floor by the apparatus, which travels along over such division and turns over and stirs the grain. When one division of the floor has been thus treated, the entire apparatus is suspended to a small carriage, which runs upon one of the I-shaped iron bars $a$, which at both ends of the room is arranged across below the ceiling. The apparatus is then run along upon the rails $a$ until it is brought to the next division of the floor upon which the grain is to be treated, and is lowered and released from the carriage, and by means of its electrical motor is made to travel along over the whole of the division. The arrangement of the floor into separate divisions varies according to the construction of the building and the other conditions which may be necessary; but it is always so constructed that the apparatus can be moved with little trouble from one division to another.

The apparatus itself consists, essentially, of a movable frame, which carries the electrical motor $b$, and to which the axle $c$ of the stirring shovels or devices is suspended. The movable frame consists of the two axles $d'$ $d^2$, arranged parallel to one another side by side, and having fixed upon their ends the four wheels $e'$ $e'$ and $e^2$ $e^2$, which run upon the rails $f$, arranged at a suitable height along the sides of the division. The two wheel-axles $d'$ $d^2$ are connected together at their ends by two triangular frames $g$, in which they can turn freely. The lower angle of the triangular frames is also provided with bearings, in which a third axle $d^3$ turns. The two frames are connected together by iron stays $g'$ and carry the electrical motor $b$, which is itself connected by means of conducting-wires $h$, passing below the ceiling of the room, with a stationary dynamo-machine. A pair of these wires $h$ enters every division of the floor and connects with the main wires $h'$, that traverse all the divisions and connect with the dynamo. The circuit thus runs through one wire $h'$, one wire $h$ to motor $b$, and back through the other wire $h$ and $h'$ to the dynamo. The action of this stationary dynamo-machine drives the motor upon the frame and sets in revolution an axle $i$, which by means of toothed wheels $i'$ $i^2$ drives the shaft $d^3$, which is connected by chain-wheels $k$ $k'$ and the chain $k^2$ with a toothed wheel $l$ upon the axle $d^4$, which revolves in bearings in the frames $g$, the toothed wheel gearing with the two corresponding toothed wheels $l'\ l^2$ upon the axles $d'\ d^2$, as shown in Figs. 2 and 3. The shaft $d^3$ is also connected by the chain-wheels $m$ $m'$ and chain $m^2$ with the shaft $c$ of the stirring apparatus. The latter is suspended from the movable frame in the following way: From both the triangular frames $g\ g$ descends an arm $g^2$, having bearings for a shaft $d^5$ and also guides for two toothed racks $n\ n$, in the lower ends of which the lower ends of the stirring-shaft $c$ revolve, as shown in Fig. 2. Toothed wheels $n'\ n'$ upon the shaft $d^5$ gear with the toothed racks and can be set in revolution by the gear-wheels and handles $n^2\ n^3$ $n^4$, which are also carried upon one end of the shaft $d^5$. The toothed wheel $n^3$ is fixed upon the shaft $d^5$, while the axle of the toothed wheel $n^2$ turns in the arm $g^2$, and by the handle $n^4$ can be turned as desired, as shown in Figs. 3 and 4. By this arrangement the mixing shovels or devices can be raised or lowered from the floor as desired, so that they dip more or less into the grain which is being treated or may be withdrawn from the latter altogether. This total withdrawal takes place if the apparatus is moved from one floor division to another. The axle $c$ is held in the desired position by means of a pawl $n^5$, gearing with a ratchet-wheel, Fig. 4. Upon the shaft $d^5$ are also fitted two bars $o\ o$, bent downward and outward, the lower ends of which are connected by a cross-bar $o'$. Under each end of this cross-bar is fixed a mold-board $o^2$, these boards being inclined both horizontally and vertically to the cross-bar $o'$, and provided at their lower edges with brushes, Figs. 3 and 5. Two small wheels $o^3$ guide this apparatus during the passage of the stirring device over the floor, and by means of the apparatus the turned-up heaps are swept together again in the proper position.

The arrangement of the shovels or stirring devices is shown upon a larger scale in Figs. 6 and 7. Upon the shaft $c$ are arranged side by side the double shovels or stirrers $p$, each set of the shovels being fixed upon the shaft at right angles to those at each side of it. Each shovel may be made of a single bent plate, two shovels being formed by two plates fitting round one-half of the shaft $c$, as shown in Fig. 6. The two plates forming a double shovel, as described, can be screwed together and may have fixed between them a strip $q$, of india-rubber or leather, which, after one of the shovels has moved forward over the floor, scatters forward with the required force any of the grain left on the floor. The end of the india-rubber strip drags over the surface of the floor, and by means of its elasticity throws forward any of the grain which may have been passed over by the plate, so that the floor is completely cleared of grain. Each shovel is provided with a plate $r$ upon both sides, so that the shovels more or less resemble buckets in form. The edges of the plates $r$ which enter the grain should have a curved or other suitable form, so that as the shovels revolve the edges of the plates enter the grain easily and smoothly.

The operation of the mixing or stirring apparatus is effected as follows by the mechanism described: By the revolution of the motor-axle $i$ in the direction of the arrow, as shown in Fig. 3, the wheels $e'\ e'\ e^2\ e^2$ are also caused to revolve in the direction of the arrows and to move the entire apparatus over the floor. At the same time the axle of the shovels is made to revolve in the opposite direction to that of the wheels $e'$ and $e^2$ in such a manner that the shovels lay hold of the grain from below and throw it and scatter it back, so that the grain is exposed to the air. The back apparatus $o^2$ then receives and collects the scattered grain, as clearly described.

By means of the cone-pulleys $k\ k'$ the speed of travel of the apparatus by means of the electrical motor can be varied as desired.

In order to remove the apparatus from one division of the floor to another, it is suspended, as already described, in any convenient way to a small carriage $s$, running upon the longitudinal rail $a$, and is moved along it to the desired position. In order that this may be done, the extreme ends of the rails $f$ must be set back from the rails $a$, without which it would not be possible to transfer the apparatus from one division of the floor to another.

By means of this invention a single machine may be made to pass over the whole of the floors. Indeed, by means of a suitable hoist the machine may be transferred to another floor at a higher or lower level, the malt or grain in which can be treated by the apparatus. This is effected by the use of an electromotor, which has the advantage over a portable steam-engine that it interferes in no way with the cleanliness necessary in breweries.

What we claim is—

1. The combination of bars $a$ with a series of transverse rails $f$, forming a series of compartments, a carriage $s$, traveling on bars $a$, battery-wires $h'$, traversing the several compartments, connecting-wires $h$, extending in pairs into each of the compartments, and with a grain-stirring apparatus adapted to be suspended from the carriage, and a motor mounted upon said apparatus and connected to the wires $h$, substantially as specified.

2. The combination of end frames $g$ with a pair of connecting-shafts $d'\ d^2$, wheels $e'\ e^2$, mounted thereon, a motor $b$, supported by the frames, a shaft $d^5$, carrying wheels $n'$, racks $n$, adapted to engage said wheels, a shaft $c$, carrying shovels and journaled in said racks, and with shaft $d^3$, pinions $i'\ i^2$ for revolving the same, and chain-wheels $m\ m'$ and chain $m^2$ for revolving shaft $c$, substantially as specified.

3. The combination of frames $g$ with shafts $d'$ $d^2$, wheels $e'$ $e^2$, mounted thereon, shaft $d^5$, inclined bars $o$, secured thereto, connecting-bar $o'$, and with the inclined mold-boards $o^2$, secured to bar $o'$, substantially as specified.

4. The combination of end frames $g$ with a series of shafts connecting the same, an electric motor supported thereby, wheels $e'$ $e^2$ on a pair of the shafts and receiving motion from the motor, a pair of vertically-adjustable racks, a shaft carrying yielding shovels and journaled in the racks, a chain for revolving the shaft, and with a pair of mold-boards secured in the rear of the shovels, substantially as specified.

In testimony whereof we hereunto sign our names, in the presence of two subscribing witnesses, this 15th day of April, 1891.

JULIUS SANDT.
    HEINRICH STURM.

Witnesses:
 EMIL DOMSCH,
 PAUL DRUCKMÜLLER.